US008998077B2

(12) United States Patent
Wong

(10) Patent No.: US 8,998,077 B2
(45) Date of Patent: Apr. 7, 2015

(54) AUTOMATIC TELLER MACHINE USING BANKNOTE PACKAGES PACKED IN ADVANCE

(76) Inventor: Kamfu Wong, Hong Kong (CN)

( * ) Notice: Subject to any disclaimer, the term of this patent is extended or adjusted under 35 U.S.C. 154(b) by 689 days.

(21) Appl. No.: 12/682,348

(22) PCT Filed: Oct. 9, 2007

(86) PCT No.: PCT/CN2007/002893

§ 371 (c)(1),
(2), (4) Date: Jul. 26, 2010

(87) PCT Pub. No.: WO2009/046567

PCT Pub. Date: Apr. 16, 2009

(65) Prior Publication Data

US 2010/0294834 A1 Nov. 25, 2010

(51) Int. Cl.
*G06K 7/00* (2006.01)
*G07F 19/00* (2006.01)
*G07D 11/00* (2006.01)

(52) U.S. Cl.
CPC .......... *G07F 19/203* (2013.01); *G07D 11/0057* (2013.01); *G07D 11/0066* (2013.01); *G07F 19/20* (2013.01)

(58) Field of Classification Search
USPC .......................................... 235/375, 379, 380
See application file for complete search history.

(56) References Cited

U.S. PATENT DOCUMENTS

2002/0023220 A1* 2/2002 Kaplan ......................... 713/176
2002/0152165 A1 10/2002 Dutta
2005/0010525 A1* 1/2005 Ross et al. ...................... 705/43
2005/0077347 A1* 4/2005 Uematsu et al. .............. 235/379

FOREIGN PATENT DOCUMENTS

CN 1441390 A 9/2003
CN 1534528 A 10/2004

(Continued)

OTHER PUBLICATIONS

First office action mailed dated Dec. 31, 2010 for China Patent application No. 200780101000.9.

*Primary Examiner* — Matthew Mikels

(74) *Attorney, Agent, or Firm* — Joshua D. Isenberg; JDI Patent

(57) ABSTRACT

An automatic teller machine comprises a plurality of banknote boxes (2) in different amounts, in which a plurality of banknote packages (11) packed in advance are loaded, each banknote package (11) having therein one to hundreds of banknotes, both the top and bottom of the banknote package (11) being printed with the same identification bar codes (1102), such that when a banknote package (11) is output from the banknote box (2), the banknote box (2) can know if the output banknote package (11) is overlapped or wrong by using the two identification bar codes (1102) at the top and bottom of the banknote package (11). When withdrawing money, the control and communication circuit unit (1) controls said banknote box (2) and the transfer roller (7) within the automatic teller machine to output a banknote package (11) corresponding to the amount of money to be withdrawn to a banknote output opening (8) for the payee to withdraw. Besides, since the banknotes are packed in a banknote package in advance, both new and old banknotes can be used as long as they can be packed in a banknote package (11). Further, some paper small changes can also be packed into a banknote package (11).

19 Claims, 8 Drawing Sheets

(56) References Cited

FOREIGN PATENT DOCUMENTS

| | | | |
|---|---|---|---|
| CN | 2710280 | Y | 7/2005 |
| CN | 1653743 | A | 8/2005 |
| CN | 101025839 | A | 8/2007 |
| CN | 101042785 | A | 9/2007 |

* cited by examiner

AUTOMATIC TELLER MACHINE USING BANKNOTE PACKAGES PACKED IN ADVANCE

TECHNICAL FIELD

This invention relates to the field of banking machines, and particularly to an automatic teller machine.

BACKGROUND ART

The general automatic teller machine (usually called "ATM") at the present time has a complicated structure. When a payee withdraws banknotes, the banknotes are output to the output opening one by one from the banknote box in the ATM. Each banknote has to pass through quite a few long paths before reaching the output opening; hence, a banknote jam fault will often occur. Once a banknote is jammed in one of the paths, the ATM cannot continue providing service. Especially some older banknotes are particularly prone to problems, frequently causing the problem of being overlapped or jammed. Therefore, banks will usually put new banknotes into the ATM. However, the supply of new banknotes is limited. When the new banknotes are not sufficient and old banknotes have to be used, it is possible to affect the service of the ATM. This is a problem in great need of being solved. In addition, the banknote box of the general ATM at the present time is complicatedly designed; hence, the path for outputting the banknote from the banknote box to the output opening is quite long. The banknotes are generally transferred by using two belts which run with banknotes clamped therebetween. The requirements on design and production process of the banknote box are very high. Since the transfer path is long, any slight error will easily cause fault of banknote jam or banknote overlap. Therefore, most of the ATMs in China at the present time utilize precise banknote boxes from abroad. These imported banknote boxes take a greater part of the cost of the ATMs manufactured in China, which affects the development of the homemade ATMs.

SUMMARY OF THE INVENTION

The object of this invention is to provide an ATM, which utilizes banknote packages in which banknotes are packed in advance for a payee to withdraw. Since the banknotes are packed in banknote packages in advance, the ATM of this invention may utilize new or old banknotes without any fault of banknote jam or banknote overlap. Besides, the structure of the ATM is simplified, the requirement on precision is lowered, thereby reducing the manufacture and maintenance cost.

The object of this invention is achieved by adopting such an ATM, mainly comprising a control and communication circuit unit (1), one to more banknote boxes (2), a display (3), a keyboard (4), a card reader (5), a receipt printer (6), a transfer roller (7), an output opening (8) and a banknote supply inlet (9), wherein the control and communication circuit unit (1) is provided therein with a computer and a communication device for exchanging information with the bank account system, and controls the operation of each component based on a predetermined program, characterized in that the banknote box (2) is loaded therein with a plurality of banknote packages (11), each banknote package (11) packing therein one to hundreds of banknotes (1104), and that when the payee withdraws money, the ATM reads the payee's account information such as bank card number through the card reader (5) and receives the password of the bank card and withdrawal information input by the payee via the keyboard (4); then the control and communication circuit unit (1) transmits the account information such as the bank card number and the password as well as the withdrawal information to the bank account system for checking and receives information of authorization from the bank account system to perform this withdrawal operation; and the control and communication circuit unit (1) controls the banknote box (2) and the transfer roller (7) in the ATM to output a banknote package (11) corresponding to the amount of money to be withdrawn to the banknote output opening (8) for the payee to withdraw.

In this way, the object of this invention is achieved.

The advantage of the ATM of this invention is that there is no fault of banknote jam or banknote overlap to occur. Since the banknotes (1104) to be withdrawn are packaged in a packaging center by using large machines, absolutely no error will occur with the amount of banknotes (1104) in the banknote packages (11), and both new banknotes and old banknotes can be used. Furthermore, the banknotes (1104) can be disinfected and straightened in the banknote packaging center in advance to make the banknotes (1104) more sanitary. In addition, during the withdrawal operation, the banknote package (11) is output to the payee as a whole; hence, it will not cause faults such as miscounting of money, banknote jam and banknote overlap besides having faster speed and higher efficiency compared with the general ATM which outputs banknotes one-by-one. Besides, the ATM of this invention is simple in structure and is thus low in manufacture and maintenance cost.

DESCRIPTION OF FIGURES

The figures are illustrative for describing the structure and main features of this invention, in which the same numerals represent the same system, device and components.

MODE OF CARRYING OUT THE INVENTION

The method of this invention is further described in details hereinafter with reference to the figures.

Figure 1:
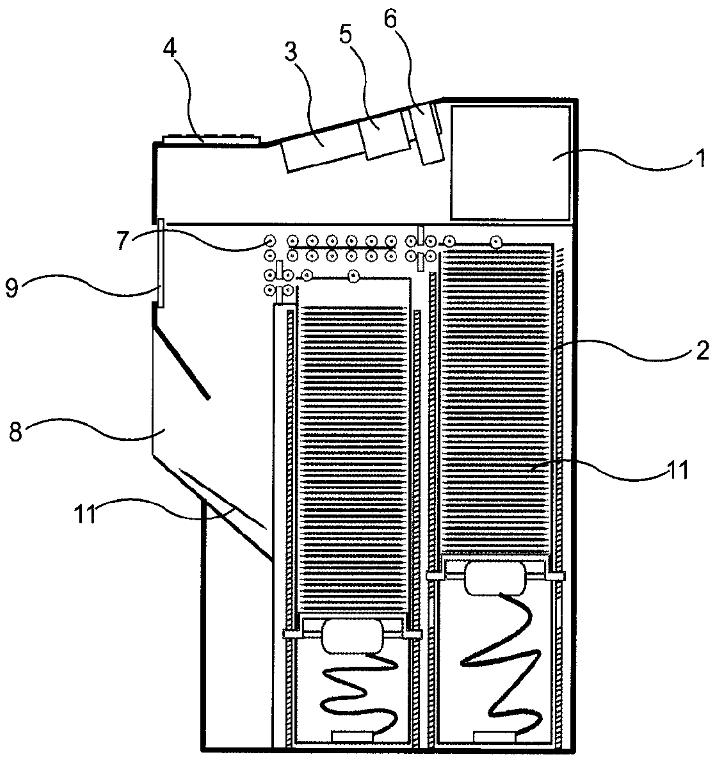
FIG. 1 is the structural schematic drawing of the ATM of this invention.
Figure 2:
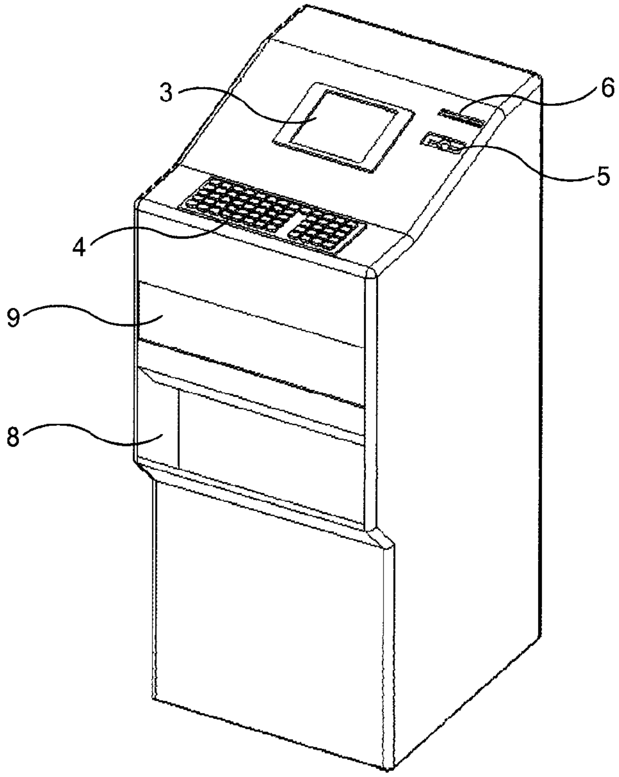
FIG. 2 is a visualized stereo schematic drawing of the ATM of this invention.
Figure 3:
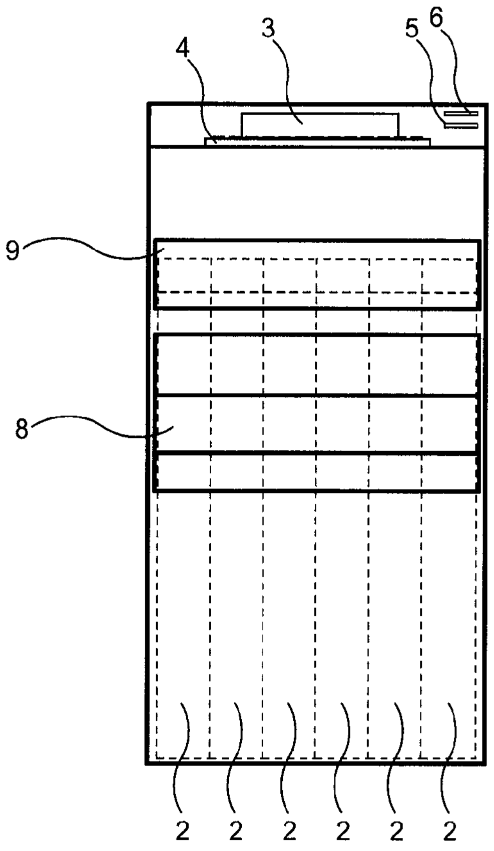
FIG. 3 is a front view of the ATM of this invention.

Referring to FIG. 1 to 3, FIG. 1 is a structural schematic drawing of the ATM of this invention; FIG. 2 is a visualized stereo schematic drawing of the ATM of this invention; and FIG. 3 is a front view of the ATM of this invention. The ATM as shown in FIGS. 1 to 3 mainly comprises a control and communication circuit unit (1), one to more banknote boxes (2), a display (3), a keyboard (4), a card reader (5), a receipt printer (6), a transfer roller (7), an output opening (8) and a banknote supply inlet (9), wherein the control and communication circuit unit (1) is provided therein with a computer and a communication device for exchanging information with the bank account system, and controls the operation of each component based on a predetermined program, characterized in that the banknote box (2) is loaded therein with a plurality of banknote packages (11), each banknote package (11) packing therein one to hundreds of banknotes (1104), and when the payee withdraws money, the ATM reads the payee's account information such as the bank card number via the card reader (5) and receives the password of the bank card and withdrawal information input by the payee via the keyboard (4); then the control and communication circuit unit (1) transmits the account information such as the bank card number and the password as well as the withdrawal information to the bank account system for checking; after checking, the bank account system performs related withdrawal operation on the account of the bank card number based on the predetermined program and transmits authorization information of performing withdrawal to the control and communication circuit unit (1); the control and communication circuit unit (1) controls the banknote box (2) and the transfer roller (7) in the ATM to output a banknote package (11) corresponding to the amount of money to be withdrawn to banknote output opening (8) for the payee to withdraw.

Again referring to FIG. 1 to 3, the ATM as shown in the embodiment in the figures has thereon altogether twelve banknote boxes (2). Different banknote boxes (2) can be used to accommodate banknote packages (11) in different amounts, usually banknote packages (11) in amounts of 100 Yuan, 300 Yuan, 500 Yuan, 1,000 Yuan, 2,000 Yuan, 3,000 Yuan, 5,000 Yuan, 10,000 Yuan, 20,000 Yuan, 30,000 Yuan, 50,000 Yuan and 80,000 Yuan, which can satisfy the need of withdrawal of the general user. Besides, banknote boxes (2) in different amounts can also be provided according to the demand of most of the users. However, the amount of the banknote boxes (2) and the amount of the banknotes are not used to limit the scope of protection of this invention. The ATM of this invention may be provided with only one banknote box (2), and may also be provided with a plurality of banknote boxes (2). All these cases can magnificently achieve the object of this invention and thus fall into the scope of this invention.

Again referring to FIG. 1 to 3, the card reader (5) shown in the figures is a magnetic card reader or a contact IC card reader or a contactless IC card reader.

Figure 4:
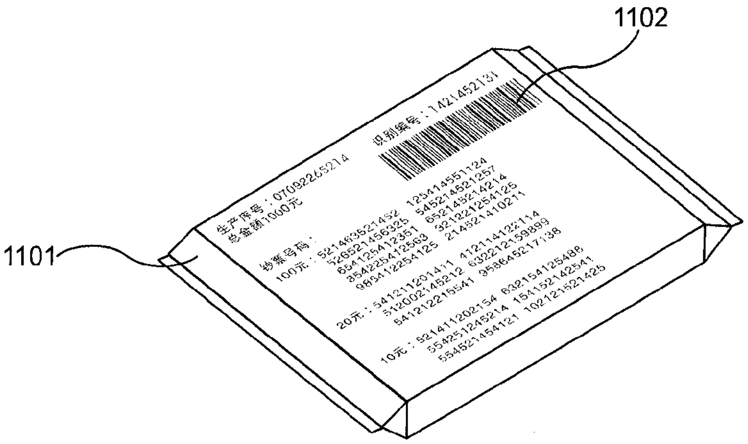
FIG. 4 is visualized stereo schematic drawing of the banknote package (11) of this invention.

Referring to FIG. 4, FIG. 4 is visualized stereo schematic drawing of the banknote package (11) of this invention. The banknote package (11) as shown in the figure packs one to hundreds of banknotes (1104) by using a packaging material (1101) on which security information of the banknote package (11) is printed. The security information includes the serial number, the production date, the production number, the banknote code of each banknote (1104) within the banknote package (11), the amount of the banknotes (1104) of each different denomination within the banknote package (11), the total amount of the banknotes (1104) within the banknote package (11), the identification code and the identification bar code (1102). The security information, printed on the banknote package (11) during production and preserved in the bank account system, can also be used as evidence for tracing when a problem occurs. For example, if a user complains about drawing counterfeit banknotes from the ATM, it is possible to know whether the banknotes (1104) are withdrawn from the ATM or not according to the record of banknote codes among the security information to thereby make appropriate settlement.

Again referring to FIG. 4, the identification bar code (1102) on the banknote package (11) as shown in the figure is printed on both the top and the bottom of the packaging material (1101) of the banknote package (11), so that when the banknote package (11) is output from the banknote box (2), the banknote box (2) can know whether there is an error with the output banknote package (11) according to the two identification bar codes (1102) on the top and the bottom of the packaging material (1101). If the banknote box (2) detects two identical identification bar codes (1102) simultaneously, it means that the banknote box (2) is outputting one banknote package (11). If the banknote box (2) detects two different identification bar codes (1102) simultaneously, it means that an error possibly occurs, and the banknote box (2) is outputting more than one banknote package (11). In this case, the banknote box (2) can stop outputting the banknote packages (11) immediately and send the banknote packages (11) back to the banknote box (2) so as to avoid error with the withdrawal operation.

Figure 5:
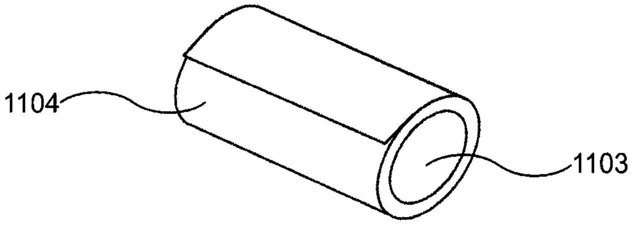
FIG. 5 is a visualized stereo schematic drawing of one embodiment of the banknotes (1104) packed together with the annexation (1103) in the banknote package (11) of this invention.

In addition, besides the banknotes (1104) other articles can also be packaged together with the banknotes (1104) within the banknote package (11). That is, the banknote package (11) packs therein one to hundreds of banknotes (1104) and an annexation (1103) by using the packaging material (1101). The annexation (1103) includes coupons, rebate coupons, advertisement hand bills, train (bus) tickets, steamer tickets, entrance tickets, chamber cards, golf cards, rebate cards, charge cards, public traffic cards, phone cards, phone recharge cards, mobile phone recharge cards, game recharge cards, gifts, candies, foods, etc. Referring to FIG. 5, FIG. 5 is a visualized stereo schematic drawing of one embodiment of the banknotes (1104) packed together with the annexation in the banknote package (11) of this invention. As shown in the figure are a plurality of banknotes (1104) rolled with the annexations (1103), i.e. the candies. In the way, the designated annexations can be sold to the customer along with the banknotes (1104) via the ATM when the customer withdraws money by binding some annexations with the banknotes. For example, banknotes (1104) in amount of 150 Yuan and one public traffic card in denomination of 50 Yuan can be placed within one banknote package (11) in amount of 200 Yuan.

Also for example, banknotes (1104) in amount of 200 Yuan and one phone recharge card in denomination of 100 Yuan can be placed within one banknote package (11) in amount of 300 Yuan. All these cases can magnificently achieve the object of this invention and thus fall into the scope of this invention. The ATM can also be used as a tool for issuing cards, for example issuing a bearer charge card through the ATM, which charge card can be opened only when money is deposited in the charge card.

Furthermore, the packaging material (1101) of the banknote package (11) can also be printed thereon with various advertisement information to increase the operation income of the ATM by charging advertising fee.

Again referring to FIG. 4, the banknotes (1104) in the banknote package (11) as shown in the figure can also be old banknotes (1104) besides brand new banknotes (1104). Since the banknotes (1104) are packed in a banknote package (11) in advance, the requirement on the banknotes (1104) is not high so long as the banknotes (1104) can be packed in the banknote package (11). Besides, some small paper money can also be packed in the banknote package (11). For example, in a banknote package (11) in amount of 500 Yuan, there can be packed with four banknotes (1104) in denomination of 100 Yuan, one banknote (1104) in denomination of 50 Yuan, three banknotes (1104) in denomination of 10 Yuan, two banknotes (1104) in denomination of 5 Yuan and 10 banknotes (1104) in denomination of 1 Yuan. This way can not only render convenience to the payee, but also can enable the banknotes (1104) in small denomination within the bank to recirculate in the market.

Figure 6:
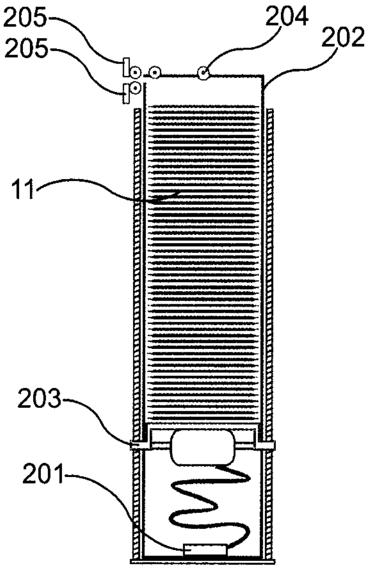
FIG. 6 is a structural schematic drawing of the banknote box (2) of the ATM of this invention.

Referring to FIG. 6, FIG. 6 is a structural schematic drawing of the banknote box (2) of the ATM of this invention. The banknote box (2) as shown in the figure comprises a controller (201), a storage bin (202), a hoisting device (203), a banknote dispenser (204) and a bar code reader (205), wherein the controller (201) automatically controls the operation of each component based on a predetermined program according to the operation of the control and communication circuit unit (1); and the hoisting device (203) is located in the storage bin (202), mainly used for driving the banknote packages (11) loaded within the storage bin (202) to move upward or downward;

the banknote dispenser (204) is located at the top of the storage bin (202) and provided with a friction roller and a transfer roller, mainly used for transferring the top one of the banknote packages (11) loaded within the storage bin (202) out of the banknote box (2);

the bar code readers (205) are located above and below the outlet of the banknote box (2), mainly used for reading the identification bar code (1102) on the packaging material (1101) of the banknote package (11) to be input/output to/from the banknote box (2) and transmitting the read information of the identification bar code (1102) to the control and communication circuit unit (1) for further processing; and when the controller (201) outputs a banknote package (11) according to the operation of the control and communication circuit unit (1), it controls the hoisting device (203) to ascend for causing the banknote packages (11) loaded within the storage bin (202) to move to the top of the storage bin (202); the banknote dispenser (204) transfers the banknote package (11) at the top out of the banknote box (2); and then the banknote package (11) falls to the outlet opening (8) from the banknote box (2) for the payee to withdraw; and when the controller (201) inputs banknote packages (11) according to the operation of the control and communication circuit unit (1), it controls the hoisting device (203) to move up and down for leaving a predetermined space between the top of the banknote package (11) loaded within the storage bin (202) and the top of the storage bin (202); and then the banknote dispenser (204) transfers the banknote package (11) to be input into the storage bin (202) from the outside of the banknote box (2); and when the banknote box (2) outputs a banknote package (11), if the two bar code readers (205) located above and below the outlet of the banknote box (2) read information of the same identification bar code (1102), it means that the banknote box (2) is outputting one banknote package (11); and if the two bar code readers (205) located above and below the outlet of the banknote box (2) read information of two different identification bar codes (1102), it means that there is an error with the operation of outputting of banknote package (11) by the banknote box (2), and the banknote box (2) is outputting more than one banknote package (11); in this case the controller (201) immediately controls the banknote box (2) to stop operation of outputting of the banknote packages (11) and transmits the related information of wrong operation to the control and communication circuit unit (1) for further processing.

Figure 7:
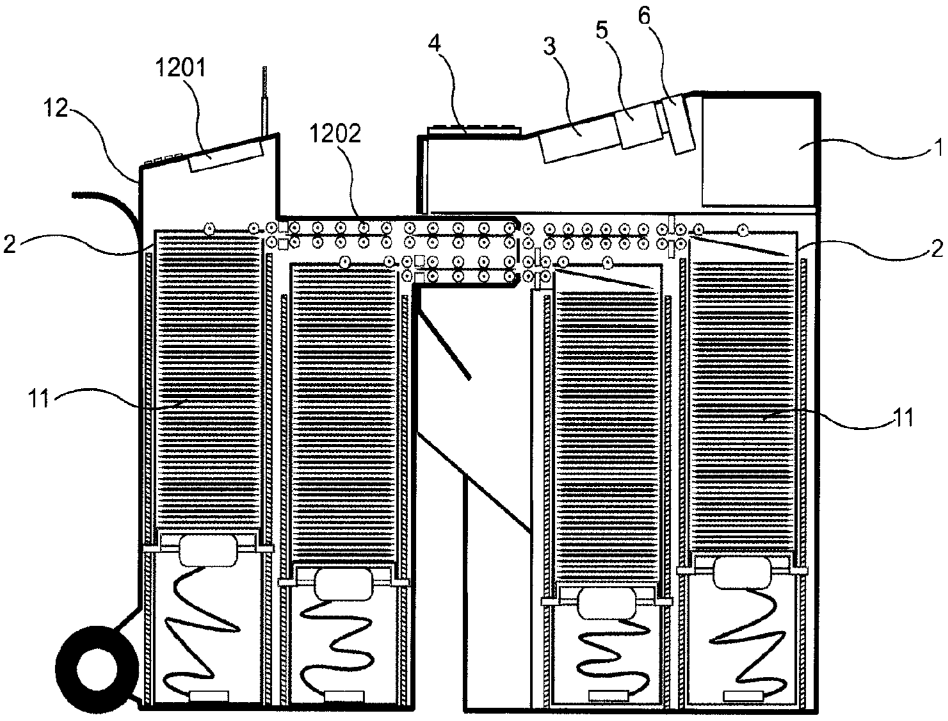
FIG. 7 is a schematic drawing of the banknote supply device (12) of this invention when supplying the ATM with banknote packages (11)

Referring to FIG. 7, FIG. 7 is a schematic drawing of the banknote supply device (12) of this invention when supplying the ATM with banknote packages (11). The ATM as shown in the figure further comprises a banknote supply device (12), mainly used for inputting banknote packages (11) into the banknote box (2) of the ATM from the outside of the ATM. The banknote supply device (12) is provided with a supply controller (1201), a plurality of transfer rollers (1202) and a plurality of banknote boxes (2), wherein the supply controller (1201) controls the operation of each of transfer rollers (1202) and each of the banknote boxes (2) based on a predetermined program for transferring banknote packages (11) within the banknote boxes (2) of the banknote supply device (12) into the banknote boxes (2) within the ATM. When the banknote supply device (12) is used to supply the ATM, the banknote supply device (12) is first brought into abutment joint with the ATM via the banknote supply inlet (9) of the ATM with the supply controller (1201) of the banknote supply device (12) being connected to the control and communication circuit unit (1) of the ATM; and then the supply controller (1201) controls each of the banknote boxes (2) and transfer rollers (1202) to transfer the banknote packages (11) loaded within each banknote box (2) into the banknote boxes (2) in the ATM one by one, and the supply control (1201) and the control and communication circuit unit (1) will respectively record detailed operation information of the banknote packages (11) output into the ATM from the banknote supply device (12), and transmit them to the bank account system. To supply the ATM with banknote packages (11) by using the banknote supply device (12) can increase the supply efficiency. When supplying banknotes to the ATM, the banks at the present time will generally replace all the banknote boxes in the ATM with new banknote boxes fully loaded with banknotes and transport the original banknote boxes back to the clearing center of the banks for re-clearing because the banknote boxes of the general ATM generally cannot be supplied with banknotes on site. Even if the banknotes within an individual banknote box are not used up, the banknote box still needs to be replaced along with all the others, which is very expensive in human resources. By using the banknote supply device (12) of this invention, it can supply each banknote box (2) in the ATM with the banknote package (11) that has not been drawn left within the banknote box (2); hence, it is not necessary to transport the original banknote boxes (2) away from the ATM, which reduces trouble of transporting banknotes back and forth.

Figure 8:
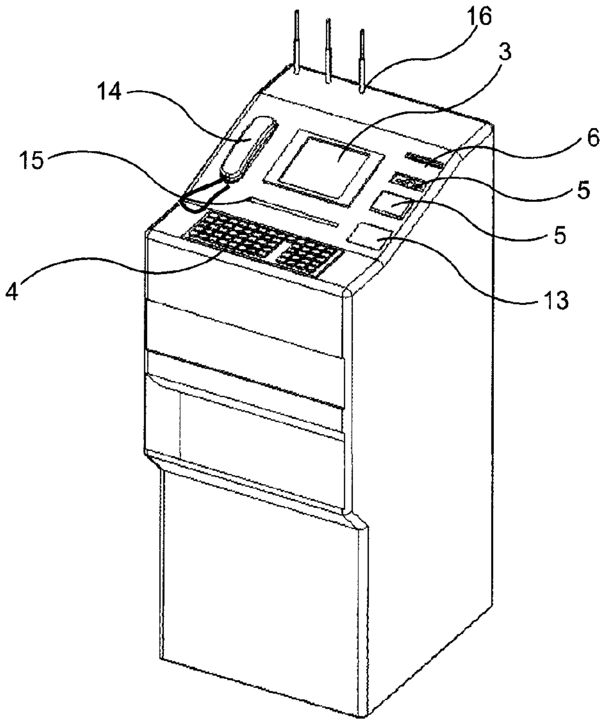
FIG. 8 is a visualized stereo schematic drawing of the ATM of this invention additionally provided with an image scanning device (13), a video phone device (14), and a WiFi device (16)

Referring to FIG. 8, FIG. 8 is a visualized stereo schematic drawing of the ATM of this invention additionally provided with an image scanning device (13), a video phone device (14), and a WiFi device (16) etc. The ATM as shown in the figure is further provided with an imaging scanning device (13), mainly used for scanning contents such as text information and bar code on the fee payment slip. The control and communication circuit unit (1) reduces the scanned image content to text information or bar code information by an optical recognition software, and then the control and communication unit (1) executes corresponding account transfer and payment operation via the bank card account of the card owner based on the content of the text information. In this description, WiFi (Wireless Fidelity) is an industry standard IEEE802.11 of wireless network communication defined by IEEE. WiFi device (16) is a wireless network communication device that conforms to this standard.

Again referring to FIG. 8, the ATM as shown in the figure is further provided with a video phone device (14), mainly used for providing video phone service to the bank card owner via the ATM and charging fee for the video phone service via the bank card account of the bank card owner.

Again referring to FIG. 8, the ATM as shown in the figure is further provided with a fax device (15) which a scanner and a printer are provided thereon, mainly used for providing fax service to the bank card owner via the ATM and charging fee for the fax service via the bank card account of the card owner. When the bank card owner sends a fax by using the ATM, he only needs to insert a bank card into the ATM and select send fax service and input bank card password via the keyboard (4). After the ATM and bank account system check the password and the account, the card owner can put the document to be faxed in the scanning device (15) for scanning and input the telephone number of the fax of the recipient via the keyboard (4). The fax device (15) will scan the content of the document and transmit it to the fax of the recipient. After the fax service is completed, the ATM will charge fee for the fax service from the bank card account via the bank account system. When the owner of the bank card receives fax by using the ATM, he only needs to insert a bank card into the ATM and select receive fax service and input the bank card password via the keyboard (4), and input the page number of the fax to be received and the telephone number of the fax of the sender via the keyboard (4). After the ATM and the bank account system check the password and the account, the ATM will transfer account from the bank card account to charge corresponding fee for the fax service via the bank account system and display the telephone number of the fax of the ATM. The card owner informs the sender to fax a document to the telephone number of the fax of the ATM by using the fax of a designated telephone number of the sender within a designated time period (for example 10 minutes). Then, the card owner can leave the ATM for the moment so that someone else can use the ATM. When the sender faxes the document to the ATM, the fax device (15) will print the fax from the sender received previously for the card owner as long as the card owner places the bank card on the card reader for reading.

Again referring to FIG. 8, the ATM as shown in the figure is further provided with a WiFi device (16), mainly used for providing WiFi wireless internet access to the wireless internet device of the bank card owner via the ATM and charging fee for the internet service via the bank card account of the card owner.

Figure 9:
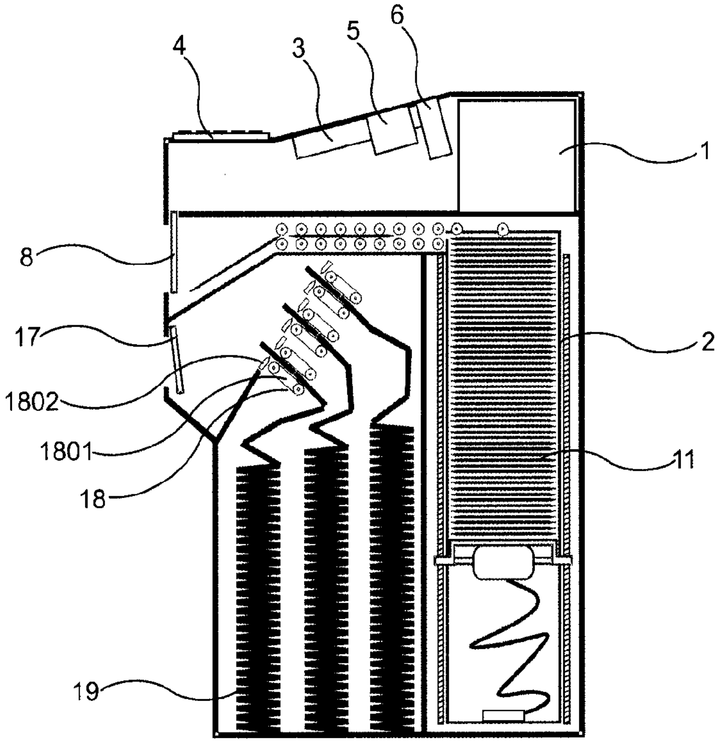
FIG. 9 is a structural schematic drawing of the ATM of this invention additionally provided with an automatic goods selling device (18)

Referring to FIG. 9, FIG. 9 is a structural schematic drawing of the ATM of this invention additionally provided with an automatic an automatic goods selling device (18). The ATM as shown in the figure is further provided with one to more automatic goods selling device (18) provided with a conveyor (1801) and a cutting device (1802). The automatic goods selling device (18) will output a goods package (19) to a goods outlet (17) according to the operation of the control and communication circuit unit (1). The goods package (19) includes goods encapsulated by using a continuous film. Besides, a plurality of goods packages (19) are connected in string by a film encapsulation material. When the control and communication circuit unit (1) controls the automatic goods selling device (18) to output a goods package (19), the conveyor (1801) will transfer the foremost one of the goods packages (19) connected in string to a predetermined position of the cutting device (1802). Then, the cutting device (1802) will cut off the film encapsulation material connecting the goods package (19) with the following goods package (19), such that the goods package (19) falls to the goods output (17).

Again referring to FIG. 9, in the embodiment of FIG. 9 the ATM can provide banknote withdrawal and goods selling services simultaneously. It is ok to pay via a bank card, including withdrawing money from the bank card account, buying goods by account transfer to pay via the bank card, withdrawing money from the bank card account and buying goods by account transfer to pay via the bank card. It is also possible that the ATM automatically outputs a goods package (19) to the payee for free when the payee withdraws money so as to attract the bank card owner to withdraw money from the ATM as much as possible.

Besides providing money withdrawal service, the ATM of this invention can also be used as a payment terminal. As long as the control and communication circuit unit (1) is embedded with a related program in advance, then the reader (5) reads information such as the bank card code of the payee and receives information such as the bank card password of the payer and the payment amount via the keyboard (4), it is possible to perform account transfer for paying via the ATM and bank account system. For example, the ATM can be positioned at the exit of a parking lot for the car owners to pay parking fee by using a bank card, and the car owners can also withdraw banknote packages (11) when paying.

In the description, bank cards refer to various cards issued by banks or financial institutions, including credit cards, charge cards, debit cards, cash cards, cash withdrawal cards, public traffic cards, etc. These cards may be traditional magnetic cards, or contact intelligent cards, or non-contact intelligent cards.

Figure 10:
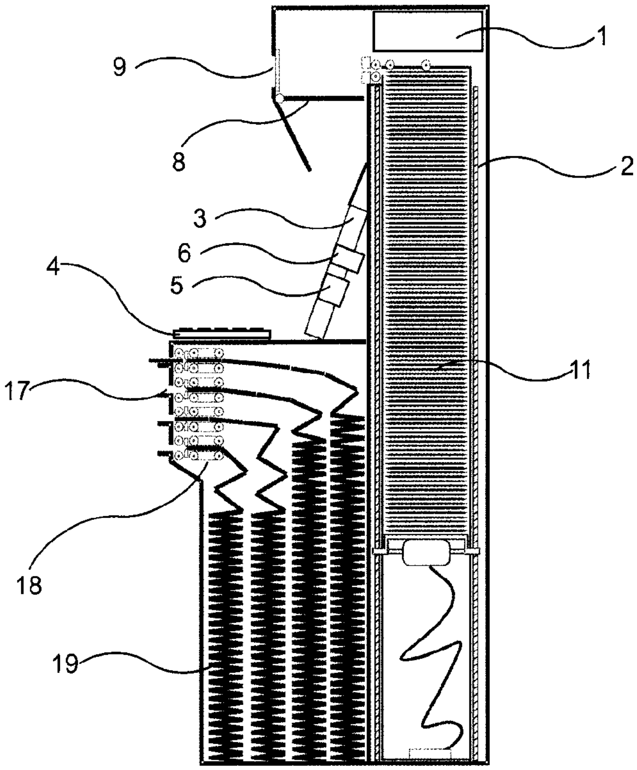
FIG. 10 is a structural schematic drawing of another embodiment of the ATM of this invention additionally provided with an automatic goods selling device (18)

Referring to FIG. 10, FIG. 10 is a structural schematic drawing of another embodiment of the ATM of this invention additionally provided with an automatic goods selling device (18). Compared with the embodiment of FIG. 9, the difference is the position of each component. Both the embodiments of FIG. 9 and FIG. 10 can magnificently achieve the object of this invention and thus fall into the scope of protection of this invention.

In addition, even further improvement of this invention is that the communication between the ATM and the bank account system is encrypted and decrypted by using a one-time secret key. That is, a plurality of one-time secret keys are stored in advance within the control and communication circuit unit (1) with each one-time secret key corresponding to one reference number. Besides, in the bank account system the same one-time secret keys and reference numbers are also stored in advance. Whenever the control and communication circuit unit (1) transmits information to the bank account system, the control and communication circuit unit (1) encrypts the information by using an unused one-time secret key and transmits the encrypted information along with the reference sign of the one-time secret key to the bank account system. The bank account system extracts one corresponding one-time secret key according to the reference number to decrypt the information to reduce to the original information. When the bank account system transmits information to the control and communication circuit unit (1), the bank account system encrypts the information by using one of the unused one-time secret key, and then transmits the encrypted information along with the reference number of the one-time secret key to the control and communication circuit unit (1). The control and communication circuit unit (1) extracts one corresponding one-time secret key according to the reference number to decrypt the information to reduce to the original information. Besides, the control and communication circuit unit (1) or the bank account system will delete the used one-time secret key and the corresponding reference number so as to ensure that the one-time secret key will not be used repeatedly.

Figure 11:
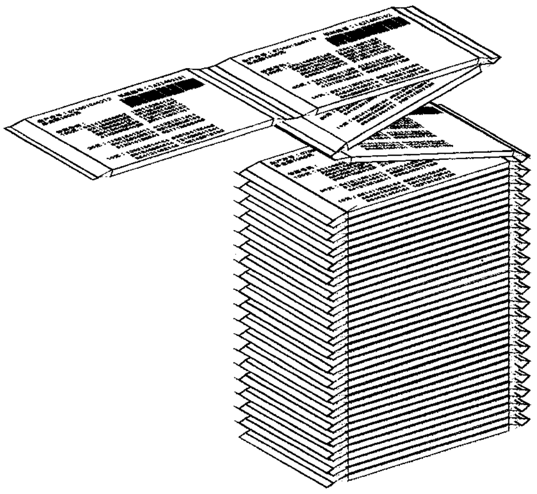
FIG. 11 is a visualized stereo schematic drawing of the banknote packages (11) encapsulated by using a continuous film.
Figure 12:
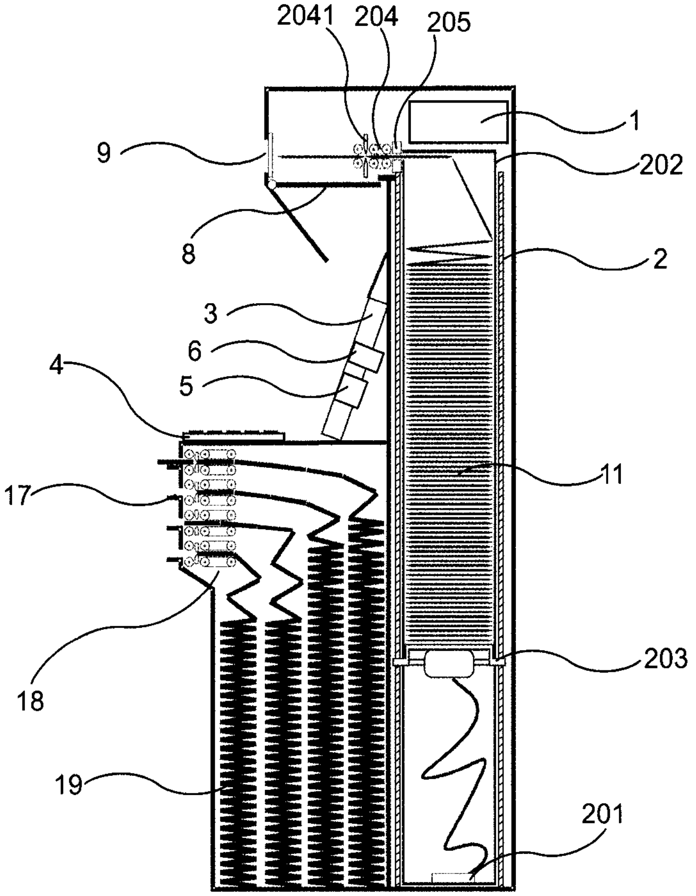
FIG. 12 is a structural schematic drawing of another embodiment of the ATM of this invention additionally provided with an automatic goods selling device (18) and utilizing the banknote packages (11) encapsulated by using a continuous film of FIG. 11.

Referring to FIGS. 11 and 12, FIG. 11 is a visualized stereo schematic drawing of the banknote packages (11) encapsulated by using a continuous film, and FIG. 12 is a structural schematic drawing of another embodiment of the ATM of this invention additionally provided with an automatic goods selling device (18) and using the banknote packages (11) encapsulated by using a continuous film. The embodiments of FIG. 11 and FIG. 12 are further improvement of this invention. Compared with the previous embodiments, the main difference of the embodiments of FIG. 11 and FIG. 12 is that the embodiments of FIG. 11 and FIG. 12 use banknote packages (11) continuously packed. To pack a plurality of banknote packages (11) in string by using a continuous film packaging material (1101) can facilitate transportation and management. Since the banknote packages (11) of the string are the same in amount, chance of error that occurs during processing of the banknote package (11) can be reduced. Again referring to FIG. 11, the banknote packages (11) as shown in the figure are encapsulated using a continuous film. A plurality of banknote packages (11) are connected in string by using a film packaging material (1101), the film packaging material (1101) is plastic or paper or metal film coated with plastic on the surface.

Again referring to FIG. 12, the banknote box (2) of the ATM as shown in the FIG. 12 comprises a controller (201), a storage bin (202), a hoisting device (203), a banknote dispenser (204) and a bar code reader (205), wherein the controller (201) automatically controls the operation of each component based on a predetermined program according to the operation of the control and communication circuit unit (1); and the hoisting device (203) is located within the storage bin (202), mainly used for driving the banknote packages (11) within storage bin (202) to move upward or downward;

the banknote dispenser (204) is located at the outlet on the top of the storage bin (202) and is provided with a transfer roller and a conveyor belt, mainly used for transferring the banknote packages (11) within the storage bin (202) out of the banknote bin (2), and is further provided with a cutting device (2041), mainly used for cutting off the packaging material (1101) connecting the banknote package (11) to be output to the payee and the banknote packages (11) within the banknote bin (2), such that the banknote package (11) leaves the banknote box (2) to fall to the output opening for the payee to withdraw;

the bar code readers (205) are located above and below the outlet of the banknote box (2), mainly used for reading the identification bar code on the packaging material (1101) of the banknote packages (11) to be input and output from the banknote box (2) and then transmitting the read information of the identification serial number bar code (1102) to the control and communication circuit unit (1) for further processing; and when the controller (201) outputs the banknote packages (11) according to the operation of the control and communication circuit unit (1), the controller (201) controls the banknote dispenser (204) to transfer one banknote package (11) within the storage bin (202) out of the banknote box (2); then the cutting device (2041) cuts off the packaging material (1101) connecting the banknote package (11) with the banknote packages (11) within the banknote box (2), such that the banknote package (11) leaves the banknote box (2) to fall to the output opening for the payee to withdraw; and when the controller (201) inputs banknote packages (11) according to the controls of the control and communication circuit unit (1), the controller (201) controls the hoisting device (203) to move up and down such that a predetermined space is kept between the top of the storage bin (202) and the banknote packages (11) within the storage bin (202) for banknote packages (11) to enter the storage bin (2) based on a predetermined program; and then the banknote dispenser (204) transfers the banknote packages (11) into the storage bin (202) to be input from the outside of the banknote box (2) one by one.

Figure 13:
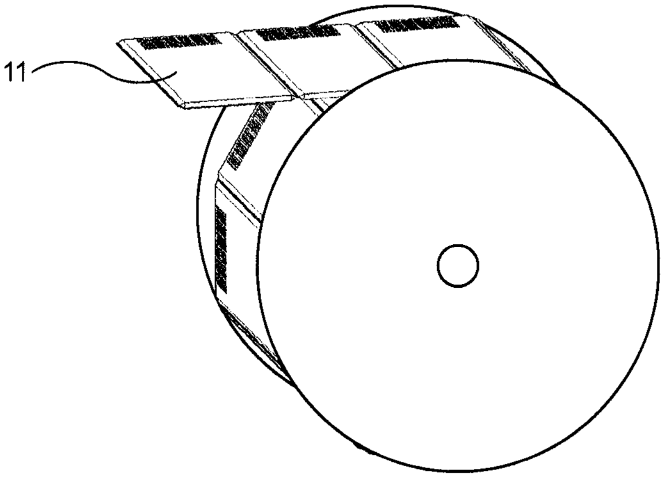
FIG. 13 is a visualized stereo schematic drawing of a roll of banknote packages (11) encapsulated in a continuous film.
Figure 14:
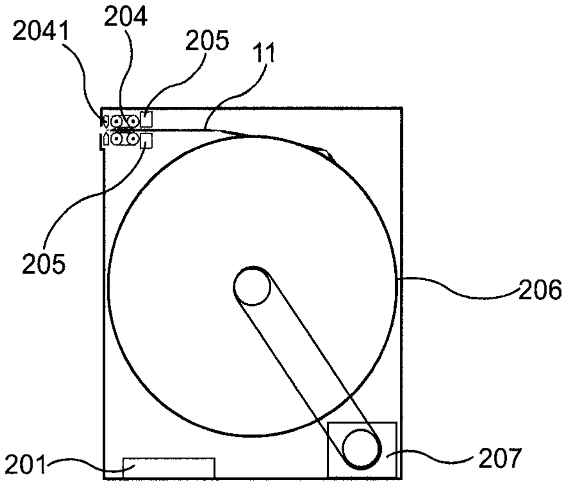
FIG. 14 is a structural schematic drawing of the banknote box (2) for loading the banknote packages (11) encapsulated in a continuous film of FIG. 13.
Figure 15:
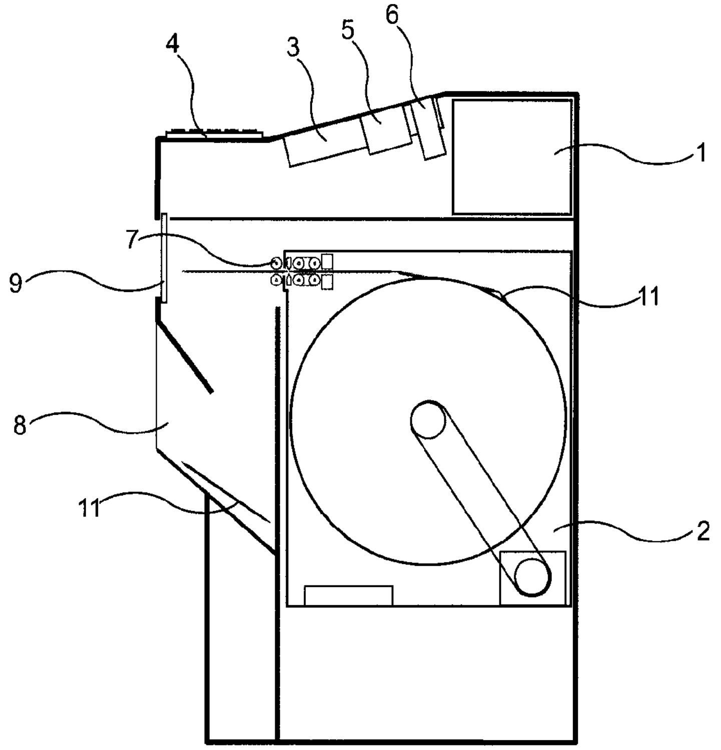
FIG. 15 is a structural schematic drawing of the ATM utilizing the banknote box (2) of FIG. 14.

Referring to FIGS. 13 to 15, FIG. 13 is a visualized stereo schematic drawing of a roll of banknote packages encapsulated in a continuous film; FIG. 14 is a structural schematic drawing of the banknote box (2) for loading the banknote packages (11) encapsulated in a continuous film of FIG. 13; and FIG. 15 is a structural schematic drawing of the ATM by using the banknote box (2) of FIG. 14. The banknote packages (11) as shown in FIG. 13 are stored on the storage roller (206) in the form of a whole roll. Compared with the banknote packages (11) in FIG. 11, the difference is that the banknote packages (11) in FIG. 11 are overlapped in a zigzag form, while the banknote packages (11) in FIG. 13 are stored in a form of a whole roll.

Again referring to FIGS. 14 and 15, the banknote box (2) of the ATM as shown in the figures comprise a controller (201), a banknote dispenser (204), a bar code reader (205), a storage roller (206) and a motor (207), wherein the controller (201) automatically controls the operation of each component based on a predetermined program according to the operation of the control and communication circuit unit (1); and the banknote dispenser (204) is located at the outlet of the banknote box (2) and provided with a transfer roller and a conveyor belt, mainly used for transferring the banknote packages (11) loaded the storage roller (206) out of the banknote box (2), and is further provided with a cutting device (2041), mainly used for cutting off the packaging material (1101) connecting the banknote package (11) to be output to the payee and the banknote packages (11) within the banknote box (2), such that the banknote package (11) leaves the banknote package (2) to fall to the outlet opening (8) for the payee to withdraw;

the bar code readers (205) are located above and below the outlet of the banknote box (2), mainly used for reading the identification number bar code (1102) on the packaging material (1101) of the banknote packages (11) to be input and output from the banknote box (2) and then transmitting the read information of identification bar code (1102) to the control and communication circuit unit (1) for further processing;

the motor (207) is mainly used for driving the storage roller (206) to rotate in cooperation with the operations such as inputting and outputting of banknote packages (11) of the banknote box (2); and when the controller (201) outputs the banknote packages (11) according to the operation of the control and communication circuit unit (1), the controller (201) controls the banknote dispenser (204) to transfer one banknote package (11) on the storage roller (206) out of the banknote box (2); then the cutting device (204) cuts off the packaging material (1101) connecting the banknote package (11) with the banknote packages (11) within the banknote box (2), such that the banknote package (11) leaves the banknote box (2) to fall to the output opening (8) for the payee to withdraw; and when the controller (201) inputs banknote packages (11) according to the operation of the control and communication circuit unit (1), the controller (201) controls the banknote dispenser to transfer the banknote packages (11) to be input into the banknote box (2) from the outside of the banknote box (2) one by one; and then the motor (207) drives the storage roller (206) to rotate so as to roll the input banknote packages (11) onto the storage roller (206).

Again referring to FIGS. 12 and 15, the ATM as shown in FIGS. 12 and 15 use banknote packages (11) encapsulated in a continuous film. When the banknote supply device (12) is used to supply banknote packages, the packaging material (1101) of the banknote packages (11) in the banknote box (2) of the ATM should be adhered together with the packaging material (1101) of the banknote packages (11) in the banknote box (2) within the banknote supply device (12), such that two strings of banknote packages (11) are adhered as one string. Then, it is possible to start transferring the banknote packages (11) in the banknote box (2) of the banknote supply device (12) into the banknote box (2) of the ATM.

Figure 16:
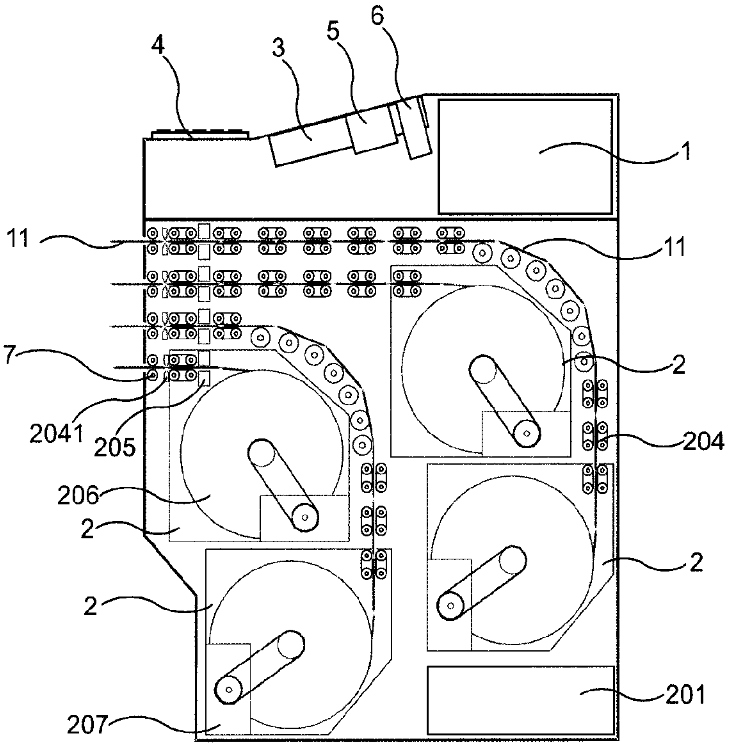
FIG. 16 is the structural schematic drawing of another embodiment of the ATM utilizing the banknote box (2) of FIG. 14.

Referring to FIG. 16, FIG. 16 is a structural schematic drawing of another embodiment of the ATM by using the banknote box (2) of FIG. 14. Compared with the ATM of FIG. 15, the difference is that each banknote box (2) of the ATM as shown in FIG. 16 has altogether four storage rollers (206), four motors (207), four pairs of bar code readers (205), and one controller (201), wherein each banknote box (2) may respectively store four banknote packages (11) in different amounts. The embodiments of FIGS. 16 and 15 are different in the amount of the components within the banknote box (2). Both the embodiments of FIGS. 16 and 15 can magnificently achieve the object of this invention and thus fall into the scope of protection of this invention.

In addition, this invention is described by using the aforesaid embodiments, but not limited to these, and it can have many changes and variations without departing from the spirit of this invention and the scope of the appended claims.

The ATM of this invention, which is simple in structure and low in cost, can efficiently solve the problem caused by using old banknotes to the ATM. Besides, the ATM of this invention can be used for other additional purposes, including goods selling, fax, video meeting, and WiFi internet access. The implementation thereof will bring about good social effect and economic effect.

The invention claimed is:

1. An automatic teller machine, mainly comprising a control and communication circuit unit (1), one to more banknote boxes (2), a display (3), a keyboard (4), a card reader (5), a receipt printer (6), a transfer roller (7), an output opening (8) and a banknote supply inlet (9), wherein the control and communication circuit unit (1) is provided therein with a computer and a communication device exchanging information with the bank account system , and controls the operation of each component based on a predetermined program, characterized in that the banknote box (2) is loaded with a plurality of banknote packages (11), each banknote package (11) packing therein one to hundreds of banknotes (1104) encapsulated by a packaging material (1101), and that when a payee withdraws money, the ATM reads the payee's account information such as the bank card number via the card reader (5) and receives the password of the bank card and the withdrawal information inputted by the payee via the keyboard (4); then the control and communication circuit unit (1) transfers the account information such as the bank card number and the password as well as the withdrawal information to the bank account system for checking and receives information of authorization for this withdrawal operation from the bank account system; and the control and communication circuit unit (1) controls the banknote box (2) and the transfer roller (7) of the automatic teller machine to output a banknote package (11) corresponding to the amount of money to be withdrawn to the output opening (8) for the payee to withdraw, wherein the automatic teller machine further includes mechanisms configured to dispense two or more different types of packages of prepackaged banknotes wherein each different type of package contains a different number or banknotes, a different denomination of banknotes or a different number and denomination of banknotes.

2. The automatic teller machine according to claim 1, characterized in that the card reader (5) is a magnetic card reader or a contact intelligent card reader or a contactless intelligent card reader.

3. The automatic teller machine according to claim 1, characterized in that security information of the banknote package (11) is printed on the packaging material, the security information including the serial number, the production date, the production number, the banknote codes of the banknotes (1104) within the banknote package (11), the amounts of the banknotes (1104) in different denominations within the banknote package (11), the total amount of the banknotes (1104) within the banknote package (11), an identification code, or an identification bar code (1102).

4. The automatic teller machine according to claim 3, characterized in that the identification bar code (1102) is printed on both the top and bottom of the packaging material (1101) for the banknote package (11).

5. The automatic teller machine according to claim 3, characterized in that the banknote package (11) includes one to hundreds of banknotes (1104) and an annexation (1103) encapsulated by the packaging material (1101), the annexation (1103) including coupons, rebate coupons, advertisement hand bills, train tickets, bus tickets, steamer tickets, entrance tickets, chamber cards, golf cards, rebate cards, charge cards, public traffic cards, phone cards, phone recharge cards, mobile phone recharge cards, game recharge cards, gifts, candies, or foods.

6. The automatic teller machine according to claim 3, characterized in that the packaging material (1101) for the banknote package (11) is further printed with advertisement information.

7. The automatic teller machine according to claim 3 or 4 or 5 or 6, characterized in that the banknote package (11) is encapsulated by a continuous film, a plurality of banknote packages (11) being connected in string by the film packaging material (1101), and that the film packaging material (1101) is plastic , paper, or metal film coated with plastic thereon.

8. The automatic teller machine according to claim 1, characterized in that the banknote box (2) comprises a controller (201), a storage bin (202), a hoisting device (203), banknote dispenser (204) and one or more bar code readers (205), wherein the controller (201) automatically controls the operation of each component based on a predetermined program according to the operation of the control and communication circuit unit (1); and the hoisting device (203) is located within the storage bin (202), mainly used for driving the banknote packages (11) stored in the storage bin (202) to move upward or downward;

the banknote dispenser (204) is located at the front of the storage bin (202) and is provided with a friction roller and a transfer roller, mainly used for transferring the top one of the banknote packages (11) stored in the storage bin (202) out of the banknote box (2);

the bar code readers (205) are located above and below the outlet of the banknote box (2), mainly used for reading the identification bar code (1102) on the packaging material (1101) of the banknote packages (11) to be inputted and outputted by the banknote box (2) and transmitting the read information of the identification bar code (1102) to the control and communication circuit unit (1) for further processing; and when the controller (201) outputs banknote packages (11) according to the operation of the control and communication circuit unit (1), the controller (201) controls the hoisting device (203) to ascend till the banknote packages (11) loaded within the storage bin (202) move to the top of the storage bin (202); the banknote dispenser (204) transfers the package (11) at the top out of the banknote box (2); and then the banknote package (11) falls to the outlet opening (8) from the banknote box (2) for the payee to withdraw; and when the controller (201) inputs banknote packages (11) according to the operation of the control and communication circuit unit (1), the controller (201) controls the hoisting device (203) to move up and down to leave a predetermined space between the top of the banknote packages (11) stored in the storage bin (202) and the top of the storage bin (202), and then the banknote dispenser (204) transfers the banknote package (11) to be inputted into the storage bin (202) from the outside of the banknote box (2).

9. The automatic teller machine according to claim 1, characterized in that the banknote box (2) comprises a controller (201), a storage bin (202), a hoisting device (203), a banknote dispenser (204) and a bar code reader (205), wherein the controller (201) automatically controls the operation of each component based on a predetermined program according to the operation of the control and communication circuit unit (1); and the hoisting device (203) is located within the storage bin (202), mainly used for driving the banknote packages (11) in the storage bin (202) to move upward or downward;

the banknote dispenser (204) is located at the outlet of the top of the storage bin (202) and is provided with a transfer roller and a conveyor belt, mainly used for transferring the banknote packages (11) in the storage bin (202) out of the banknote box (2), and further provided with a cutting device (2041), mainly used for cutting off the packaging material (1101) connecting the banknote package (11) to be output to the payee with the banknote packages (11) in the banknote bin (2), such that the banknote package (11) leaves the banknote bin (2) to fall to the output opening (8) for the payee to withdraw;

the bar code readers (205) are located above and below the outlet of the banknote box (2), mainly used for reading the identification bar code (1102) on the packaging material (1101) of the banknote packages (11) to be input and output by the banknote box (2) and transmitting the read information of the identification bar code (1102) to the control and communication circuit unit (1) for further processing; and when the controller (201) outputs banknote packages (11) according to the operation of the control and communication circuit unit (1), the controller (201) controls the banknote dispenser (204) to transfer one banknote package (11) within the storage bin (202) out of the banknote box (2); and then the cutting device (2041) cuts off the packaging material (1101) connecting the banknote package (11) with the banknote packages (11) in the banknote box (2), such that the banknote package (11) leaves the outlet of the banknote box (2) to fall to the output opening (8) for the payee to withdraw; and when the controller (201) inputs banknote packages (11) according to the operation of the control and communication circuit unit (1), the controller (201) controls the hoisting device (203) to move up and down to leave a predetermined space between the top of the storage bin (202) and banknote packages (11) in the storage bin (202) so that banknote packages (11) can enter the storage bin (202) according to a predetermined program; and then the banknote dispenser (204) transfers the banknote packages (11) to be input into the storage bin (202) from the outside of the banknote box (2) one by one.

10. The automatic teller machine according to claim 1, characterized in that the banknote box (2) comprises a controller (201), a banknote dispenser (204), a bar code reader (205), a storage roller (206) and a motor (207), wherein the controller (201) automatically controls the operation of each component based on a predetermined program according to the operation of the control and communication circuit unit (1); and the banknote dispenser (204) is located at the outlet of the storage bin (202) and is provided with a transfer roller and a conveyor belt, mainly used for transferring the banknote packages (11) loaded on the transfer roller (206) out of the banknote box (2), and is further provided with a cutting device (2041), mainly used for cutting off the packaging material (1101) connecting the banknote package (11) to be output to the payee with the banknote packages (11) in the banknote box (2), such that the banknote package (11) leaves the banknote box (2) to fall to the output opening (8) for the payee to withdraw;

the bar code readers (205) are located above and below the outlet of the banknote box (2), mainly used for reading the identification bar code (1102) on the packaging material (1101) of the banknote packages (11) to be input/output to/from the banknote box (2) and transmitting the read information of the identification bar code (1102) to the control and communication circuit unit (1) for further processing;

the motor (207) is mainly used for driving the storage roller (206) to rotate in cooperation with operations such as inputting/outputting banknote packages (11) to/from the banknote box (2); and when the controller (201) outputs banknote packages (11) according to the operation of the control and communication circuit unit (1), the controller (201) controls the banknote dispenser (204) to transfer one banknote package (11) on the storage roller (206) out of the banknote package box (2); and then the cutting device (2041) cuts off the packaging material (11) connecting the banknote package (11) with the banknote packages (11) in the banknote box (2), such that the banknote package (11)

leaves the outlet of the banknote box (2) to fall to the output opening (8) for the payee to withdraw; and when the controller (201) inputs banknote packages (11) according to the operation of the control and communication circuit unit (1), the controller (201) controls the banknote dispenser (204) to transfer the banknote packages (11) to be input into the banknote box (2) from the outside of the banknote box (2) one by one, and then the motor (207) drive the storage roller (206) to rotate to roll the input banknote packages (11) onto the storage roller (206).

11. The automatic teller machine according to claim 8 or 9 or 10, characterized in that when the banknote box (2) outputs banknote packages (11), if the information from the identification bar code (1102) read by two bar code readers (205) located above and below the outlet of the banknote box (2) are identical, that means the banknote box (2) is outputting one banknote package (11); and if the two bar code readers (205) located above and below the outlet of the banknote box (2) read information of two different identification bar codes (1102) are not identical, that means there is an error during the operation of outputting banknote packages (11) from the banknote box (2), and more than one banknote package (11) are output from the banknote box (2); and in this case, the controller (201) immediately controls the banknote box (2) to stop the operation of outputting of the banknote packages (11) and transmits the related information of the wrong operation to the control and communication circuit unit (1) for further processing.

12. The automatic teller machine according to claim 1 or 8 or 9 or 10, characterized in that the automatic teller machine further comprises a banknote supply device (12) with which a supply control (1201), a plurality of transfer rollers (1202) and a plurality of banknote boxes (2) are provided, mainly used for inputting banknote packages (11) into the banknote box (2) of the automatic teller machine from the outside of the automatic teller machine, wherein the supply control (1201) controls the operation of each of the transfer rollers (1202) and banknote boxes (2) based on a predetermined program to transfer the banknote packages (11) in the banknote boxes (2) of the banknote supply device (12) into the banknote boxes (2) of the automatic teller machine.

13. The automatic teller machine according to claim 12, characterized in that when the banknote supply device (12) is used to supply the automatic teller machine with banknotes, it is first brought into abutment joint with the automatic teller machine via the bank supply inlet (9) of the automatic teller machine, and the supply control (1201) of the banknote supply device (12) is connected with the control and communication circuit unit (1) of the automatic teller machine through wires; then the supply control (1201) controls each of the banknote boxes (2) and the transfer roller (1202) to transfer the banknote packages (11) loaded in each banknote box (2) into the banknote box (2) in the automatic teller machine one by one; and the supply control (1201) and the control and communication circuit unit (1) will respectively record the detailed information of operations of outputting the banknote packages (11) from the banknote supply device (12) to the automatic teller machine, which is transferred to the bank account system by the control and communication circuit unit (1).

14. The automatic teller machine according to claim 1, characterized in that the automatic teller machine is further provided with an image scanning device (13), mainly used for scanning contents such as text information and bar code on the fee payment slip, the control and communication circuit unit (1) reducing the scanned image content to text information or bar code information by using an optical recognition software and then the control and communication unit (1) executing corresponding account transfer and payment operation via the bank card account of the owner based on the text information.

15. The automatic teller machine according to claim 1, characterized in that the automatic teller machine is further provided with a video phone device (14), mainly used for providing video phone service to the bank card owner through the automatic teller machine and charging fee for the video phone service through the bank card account of the card owner.

16. The automatic teller machine according to claim 1, characterized in that the automatic teller machine is further provided with a fax device (15) provided thereon with a scanner and a printer, the fax device (15) being mainly used for providing fax service to the bank card owner through the automatic teller machine and charging fee for fax service through the bank card account of the card owner.

17. The automatic teller machine according to claim 1, characterized in that the automatic teller machine is further provided with a WiFi device (16), mainly used for providing WiFi wireless internet access to the wireless internet device of the bank card owner through the automatic teller machine and charging fee for the internet service through the bank card account of the card owner.

18. The automatic teller machine according to claim 1, characterized in that the automatic teller machine is further provided with one to more automatic goods selling devices (18) provided thereon with a conveyor (1801) and a cutting device (1802), wherein the automatic goods selling device (18) will output a goods package (19) to a goods outlet (17) according to the operation of the control and communication circuit unit (1), the goods package (19) including goods encapsulated by using a continuous film, and a plurality of goods packages (19) being connected in string by using a film encapsulation material, and that when the control and communication circuit unit (1) controls the automatic goods selling device (18) to output goods packages (19), the conveyor (1801) the foremost one of the goods packages (19) connected in string to a predetermined position of the cutting device (1802) and the cutting device (1802) will cut off the film encapsulation material connecting the good package (19) with the following good packages (19), such that the goods package (19) falls to the goods outlet (17).

19. The automatic teller machine according to claim 1, characterized in that the control and communication circuit unit (1) stores therein a plurality of one-time secret keys in advance with each one-time secret key corresponding to one reference number, and the bank account system stores the same one-time secret keys and reference number in advance, and that whenever the control and communication circuit unit (1) transmits information to the bank account system, the control and communication circuit unit (1) encrypts the information by using an unused one-time secret key and then transmits the encrypted information along with the reference number of the one-time secret key to the bank account system; the bank account system extracts one corresponding one-time secret key according to the reference number to decrypt the information to reduce to the original information, and that whenever the bank account system transmits information to the control and communication circuit unit (1), it encrypts the information by using one of the unused one-time secret keys and then transmits the encrypted information along with the reference number of the one-time secret key to the control and communication circuit unit (1); the control and communication circuit unit (1) extracts one corresponding one-time secret key according to the reference number to decrypt the information to reduce to the original information, and that the control and communication circuit unit (1) or the bank account system will delete the used one-time secret key and the corresponding reference number for ensure that the one-time secret key will not be used repeatedly.

* * * * *